United States Patent [19]

Treadwell

[11] 4,223,098
[45] Sep. 16, 1980

[54] BLOWING CATALYST COMPOSITION FOR LOW DENSITY FLEXIBLE POLYURETHANE FOAMS

[75] Inventor: Kenneth Treadwell, Rahway, N.J.

[73] Assignee: M&T Chemicals Inc., Woodbridge, N.J.

[21] Appl. No.: 955,906

[22] Filed: Oct. 30, 1978

Related U.S. Application Data

[63] Continuation-in-part of Ser. No. 879,633, Feb. 21, 1978, Pat. No. 4,173,691.

[51] Int. Cl.³ .............................................. C08G 18/24
[52] U.S. Cl. .............................. 521/116; 252/431 C; 260/18 TN; 521/124; 521/125; 521/126; 521/127; 521/131
[58] Field of Search ............... 521/116, 124, 125, 126, 521/127, 131

[56] References Cited

U.S. PATENT DOCUMENTS

| | | | |
|---|---|---|---|
| 3,620,985 | 11/1971 | Larkin et al. | 260/18 TN |
| 3,940,517 | 2/1976 | De Leon | 427/373 |

*Primary Examiner*—Maurice J. Welsh
*Attorney, Agent, or Firm*—Stanley A. Marcus; Robert Spector

[57] ABSTRACT

Low density flexible polyurethane foams can be prepared using water and relatively large amounts of methylene chloride as the foaming agents in the presence of an organic or inorganic tin compound as the gel catalyst and a foaming catalyst consisting essentially of catalytically effective amounts of an antimony carboxylate, a potassium carboxylate and a zinc carboxylate.

6 Claims, No Drawings

BLOWING CATALYST COMPOSITION FOR LOW DENSITY FLEXIBLE POLYURETHANE FOAMS

BACKGROUND OF THE INVENTION

This application is a continuation-in-part of Application Ser. No. 879,633, filed on Feb. 21, 1978 & now U.S. Pat. No. 4,173,691 issued Nov. 6, 1979.

This invention relates to low density polyurethane foams and more specifically to a blowing agent and blowing catalyst composition for producing these foams.

It is well known that polyurethanes can be prepared by reacting organic polyfunctional isocyanates with organic polyols having two or more reactive hydrogen atoms as determined by the Zerewitinoff method. When this reaction is conducted under anhydrous conditions and in the absence of gas-forming reagents the resulting polyurethane is often nonporous. If a cellular or foamed product is desired, a blowing agent, which may comprise water and an excess of the polyfunctional isocyanate must be present in the initial reaction mixture. The reaction of water with the isocyanate compound produces carbon dioxide which is temporarily entrapped in the reaction mixture as it solidifies and foams a network of interconnecting open cells. The density of the resultant foam is from 1.5 to 2 pounds per cubic foot (24 to 32 kg per cubic meter), depending upon the amounts of excess isocyanate and water employed. Foams exhibiting densities from 0.7 to 1.2 pound per cubic foot (11–16 kg per cubic meter), often referred to as "super soft" foams, are desirable for a number of end uses, including packing material for preventing damage to delicate articles during shipping and as filling for upholstery pillows. While it may be possible to prepare these lower density foams using as the sole blowing agent the carbon dioxide generated by the reaction of water with the polyfunctional isocyanate, this method may not be commercially practical due to the relatively high cost of the isocyanate reagent. A more conventional procedure for preparing low density urethane foams is to employ an auxiliary foaming or blowing agent which is usually a fluorine-containing hydrocarbon, such as trichlorofluoromethane. The fluorocarbon is used either alone or in combination with methylene chloride. These fluorocarbons exhibit significant vapor pressures at ambient temperatures and are volatilized during the exothermic reaction of the isocyanate with the polyol. The vaporized fluorocarbon is temporarily entrapped within the reaction mixture and forms the desired network of open cells in the same manner as the carbon dioxide formed during the isocyanate-water reaction. A disadvantage of using fluorocarbons as auxiliary foaming agents is the relatively high cost of these compounds. It would therefore be economically attractive to entirely replace these compounds with less expensive halocarbons such as methylene chloride. Up until now it has not been feasible to obtain foams of uniform cellular structure using amines, which are conventional blowing catalysts, and concentrations of methylene chloride in excess of 10% by weight of the polyol employed to prepare the polyurethane. The resultant foams often contain fissures and large internal voids which make them unsuitable for the intended end use. The foams may also contain a relatively large number of closed cells, which cause the foam to shrink as the gas trapped in the closed cells cools.

If one employs a tertiary amine in combination with an organic or inorganic tin compound such as stannous octoate as the gel catalyst, a relatively high concentration of tin compound in combination with specific amines is required to prepare useful foams. As demonstrated in the accompanying examples, this requirement considerably reduces the range of operable process conditions when a relatively large concentration of methylene chloride is employed as a blowing agent in combination with water.

It is therefore an objective of this invention to provide a blowing catalyst composition which can be employed with large concentrations of methylene chloride as the blowing agent for the preparation of low density urethane foams that exhibit a uniform cell structure.

SUMMARY OF THE INVENTION

This invention provides a method for preparing low density cellular polyurethanes, said method comprising reacting a polyol having at least two reactive hydrogen atoms, as determined by Zerewitinoff method, with an organic polyfunctional isocyanate in the presence of (a) from 0.5 to 40%, based on the weight of said polyol, of a blowing agent consisting essentially of water and from 10 to 90%, based on the total weight of said blowing agent, of methylene chloride, (b) a catalytically effective amount of a gel catalyst selected from the group consisting of stannous salts of monocarboxylic acids, wherein the acid contains from 1 to 20 carbon atoms, and organotin compounds of the general formula $R_aSnX_{4-a}$, wherein R is selected from alkyl and alkenyl radicals, each of which contain from 1 to 18 carbon atoms, cycloalkyl, aryl, alkaryl and aralkyl hydrocarbon radicals, and the foregoing radicals when inertly substituted, and X represents a monovalent radical selected from the group consisting of halogen atoms and radicals of the general formula R'COO—, R'S—, R'O— and —SR"COOR' wherein R' is in turn selected from the same group as R and R" is an alkylene radical containing from 1 to 8 carbon atoms, and (c) a catalytically effective amount of a blowing catalyst composition consisting essentially of an antimony carboxylate, a potassium carboxylate and a zinc carboxylate, wherein the hydrocarbyl portions of said carboxylates contain from 1 to 20 carbon atoms and wherein each of said antimony and potassium carboxylates constitutes from 10 to 40% by weight of said catalyst composition and the zinc carboxylate constitutes the remaining 20 to 80% by weight.

DETAILED DESCRIPTION OF THE INVENTION

The present blowing catalyst compositions are useful for preparing low density flexible polyurethane foams from substantially all of the known polyols and polyfunctional isocyanates conventionally employed for this purpose. The catalysts are mixtures of antimony, potassium and zinc salts of carboxylic acids containing from 2 to 21 carbon atoms and are employed at a concentration of from 0.05 to 10%, based on the weight of polyol. These salts can be referred to as reaction products of one or more carboxylic acids with basic compounds of antimony, potassium and zinc. Suitable monocarboxylic acids include acetic, propanoic, butanoic, pentanoic, hexanoic, heptanoic and 2-ethylhexanoic acids in addition to other acids containing up to 21 carbon atoms. Unsaturated carboxylic acids derived from oils such as tall oils or animal fats, including oleic acid and linoleic acid, may also be employed. Aromatic carboxylic acids such as a substituted or unsubstituted benzoic acid, salicylic acid, and the isomeric naphthenoic acids are also suitable reagents for preparing the catalyst compositions of this invention. Polycarboxylic acids such as oxalic, malonic, succinic, glutaric, adipic, pimelic, suberic, azelaic, sebacic, brassylic, thapsic, maleic, fumaric, glutaconic, α-hydroxymuconic, β-hydroxymuconic, α-butyl-α-ethylglutaric, α,β-diethylsuccinic, isophthalic, terephthalic, hemimellitic and 1,4-cyclohexane dicarboxylic acids, can be used in place of a monocarboxylic acid. Any of the aforementioned acids can be employed separately or in mixtures containing two or more acids.

Preferably the antimony, potassium, and zinc compounds that constitute the present blowing catalyst compositions are salts of monocarboxylic acids and exhibit the general formulae $Sb(OOCR^1)_3$, $KOOCR^2$ and $Zn(OOCR^3)_2$, respectively, wherein $R^1$, $R^2$ and $R^3$ are hydrocarbyl and contain from 1 to 20 carbon atoms. The term "hydrocarbyl" includes alkyl, cycloalkyl, aryl, alkaryl and aralkyl. Most preferably $R^1$, $R^2$ and $R^3$ are alkyl and contain from 4 to 12 carbon atoms. Acids containing 8 carbon atoms in a linear or branched configuration, including 2-ethylhexoic acid, are particularly preferred.

The relative amounts of antimony, potassium and zinc carboxylates that are present in the blowing catalyst compositions of this invention will be determined, at least in part, by the relative rates desired for the isocyanate-water and isocyanate-polyol reactions. If the rate of gas evolution is too rapid relative to the rate of polymerization, the resultant foam may collapse or exhibit numerous external fissures and voids within the interior of the foam.

The antimony and potassium salts each constitute from 10 to 40% by weight of the composition, the remaining 20 to 80% being the zinc salt. The composition may also include a solvent for all three salts that is also compatible with the polyol employed to prepare the polyurethane foam. Preferred solvents include oligomers of ethylene oxide and propylene oxide. Liquid polypropylene glycols exhibiting molecular weights of from 300 to about 5,000 are particularly preferred.

The carboxylates of potassium, antimony and zinc that constitute the present blowing catalyst compositions can be prepared individually and then combined in the desired proportions. Alternatively, the mixture of carboxylates can be prepared by reacting a stoichiometric amount of the desired carboxylic acid with basic compounds of potassium, antimony and zinc in the desired proportions. It is generally convenient to employ a hydroxide or oxide as the basic compound, however, basic salts such as the carbonate or bicarbonate are also suitable. The basic compounds of potassium, antimony and zinc are reacted individually or as a mixture with the desired carboxylic acid or acids. The reaction is preferably conducted in the presence of a water-immiscible, chemically inert liquid medium such as a liquid aliphatic or aromatic hydrocarbon. Since the reaction is usually exothermic, it may be desirable to stir and cool the reaction mixture to avoid localized overheating and resultant product discoloration. The by-product water can be removed during the reaction by azeotropic distillation together with a portion of the liquid hydrocarbon employed as the reaction medium. Alternatively, the water can be removed as an immiscible phase following completion of the reaction.

The polyols conventionally employed to prepare flexible polyurethane foams are liquids which typically exhibit an average molecular weight of from about 500 to 6,000 and include hydroxyl-containing polyethers, polyesters and alkylene glycols. These polyols exhibit either primary or secondary active hydroxyl groups.

Hydroxyl-terminated polyethers, a preferred type of polyol, include polyalkylene glycols, e.g., polyethylene glycols and polypropylene glycols. The molecular weight of these compounds is typically between about 200 and 6,000.

Hydroxyl-terminated polyesters, a second type of polyol, can be obtained by the esterification-condensation reaction of aliphatic dibasic carboxylic acids with glycols, triols or mixtures thereof, in proportions such that most or all of the resultant polymer chains contain terminal hydroxyl groups. Dibasic carboxylic acids suitable for preparing polyesters include aliphatic and aromatic acids such as adipic, fumaric, sebacic and the isomeric phthalic acids. The acid is reacted with a di- or polyhydroxylated compound such as ethylene glycol, glycerine, trimethylol propane or pentaerythrotol.

The isocyanate compounds employed to prepare flexible polyurethane foams are usually difunctional and include, for example, hexamethylene diisocyanate and the isomeric xylylene diisocyanates and phenylene diisocyanates. A mixture containing 80% of the 2,4-isomer and 20% of the 2,6-isomer of toluene diisocyanate is particularly preferred.

The preparation of flexible urethane foams can be accomplished by forming a prepolymer, i.e. prereacting stoichiometric amounts of the polyol and polyfunctional isocyanate in the absence of blowing agents and thereafter producing a foam by the addition of excess isocyanate, water, methylene chloride, a tin-containing gel catalyst and the blowing catalyst composition of this invention. Alternatively foams can be prepared using the so-called "one-shot" method whereby the polyol, blowing agents and polyfunctional isocyanate are simultaneously mixed together and allowed to react in the presence of the gel and blowing catalysts. Foams can also be produced using a semiprepolymer obtained by reacting the polyol with excess isocyanate to form a reaction product containing a high percentage (20-35%) of free isocyanate groups. This material is subsequently converted to a foam by reacting it with additional polyol in the presence of a gel catalyst and a blowing catalyst.

Cell modifying agents, including reaction products of ethylene or propylene oxide with a polysiloxane, are useful when preparing urethane foams in accordance with the present method.

The polyfunctional isocyanate is typically present in an amount of 5 to 300 percent, e.g., 40 percent by weight of the polyol. Water and methylene chloride are present in amounts sufficient to generate the volume of gas required to produce a foam of the desired density. Approximately 1 to 10 percent water, based upon the weight of the polyol, is preferred. The concentration of blowing agent in the formulation employed to prepare the foam is from 0.5 to 40%, based on the weight of the polyol. Methylene chloride constitutes from 10 to 90% by weight of the total blowing agent, the remainder being water.

The amount of isocyanate conventionally used in the preparation of flexible polyurethane foams is nearly equal to or slightly in excess of the stoichiometric amount required to form urethane linkages, —NHCOO—, by reaction with all of the active hydrogens in the polyol. Depending upon the desired density of the urethane foam and the amount of crosslinking desired, the ratio of the number of equivalents of isocyanate groups to the number of moles of reactive hydrogen atoms present in the polyol and the water is from 0.8 to 1.2, preferably from 0.9 to 1.1.

The blowing catalyst compositions of this invention can be used in combination with any of the organic or inorganic tin compounds which are known to catalyze the reaction between a polyol and a polyfunctional isocyanate to yield a polyurethane. Suitable tin compounds exhibit the general formula $Sn(-OCOR)_2$ or $R_a SnX_{4-a}$ wherein R is defined in the preceding specification and a is 1 or 2. The preferred stannous carboxylates are stannous oleate and stannous 2-ethylhexoate. If an organotin compound is employed as the gel catalyst, X preferably represents 2-ethylhexoate, a lauryl mercaptide residue or a residue of a mercaptoacid ester formed by removal of a hydrogen atom from the thio (—SH) group of the ester or mercaptan.

In the practice of this invention, the gel catalyst is present in an amount equivalent to from 0.01 to 5 parts of weight per part of blowing catalyst.

In one preferred embodiment, when the blowing catalyst composition of this invention is used with stannous 2-ethylhexoate as the gel catalyst, the weight ratio of the two catalysts will be approximately 1.

Preferably the mixture of gel and blowing catalysts will be present in a catalytically effective amount, which is usually from 0.01 to 10 parts by weight per 100 parts of polyol. The components of the mixture are each present at a level of from 0.005 to 5 parts by weight per 100 parts of polyol.

Specified preferred embodiments of the present blowing catalyst compositions are described in the following examples, wherein all parts and percentages are by weight unless otherwise indicated.

EXAMPLE 1 (Control)

"One-shot" flexible polyurethane foams were prepared using the following base formulation:
Polyol (a condensation product of glycerine and propylene oxide, average molecular weight=3,000, average hydroxyl number=56)

|  |  |
|---|---|
|  | 100.0 |
| Methylene chloride | 25.0 |
| Water | 3.5 |
| Surfactant (a silicone-oxyalkylene copolymer) | 1.2 |
| Stannous octoate | as noted |
| Blowing catalyst | in Table I |

This base formulation was combined with 45.2 parts of a mixture of isomeric toluene diisocyanates (80% of 2,4- and 20% of 2,6- isomers). The resultant composition was then thoroughly blended by stirring it rapidly for several seconds after which it was allowed to rise. The number of seconds which elapsed between combining of all reactants and opacification of the initially clear reaction mixture is designated in the following table as the "cream time". The number of seconds between combining of the reactants and the time at which the foam reaches its final height is referred to as the "rise time".

Three mixtures of antimony tris-2-ethylhexoate and potassium 2-ethyl hexoate were employed as the blowing catalyst. The blowing catalyst compositions were dissolved in a polypropylene glycol available as Pluracol ®-410 from BASF-Wyandotte Corporation prior to being added to the base formulation.

The blowing catalyst compositions identified as A-C in Table I exhibited the following composition:
Catalyst A
80 parts antimony tris-2-ethylhexoate
13 parts potassium 2-ethylhexoate
107 parts polypropylene glycol
Catalyst B
72 parts antimony tris-2-ethylhexoate
26 parts potassium 2-ethylhexoate
102 parts polypropylene glycol
Catalyst C
64 parts antimony tris-2-ethylhexoate
31 parts potassium 2-ethylhexoate
100 parts polypropylene glycol

TABLE I (Control Formulations)
Catalytic Activity of Mixtures Containing Antimony and Potassium Salts

| Catalyst (parts) | (1) | (2) | (3) | (4) | (5) | (6) | (7) |
|---|---|---|---|---|---|---|---|
| Stannous Octoate | 0.70 | 0.70 | 0.70 | 0.50 | 0.80 | 0.60 | 0.70 |
| Catalyst A | 0.15 | 0.30 | 0.60 | 0.60 | 0.30 | — | — |
| Catalyst B | — | — | — | — | — | 0.20 | — |
| Catalyst C | — | — | — | — | — | — | 0.20 |
| Cream Time, sec. | 12 | 13 | 16 | 17 | 12 | 13 | 13 |
| Rise Time, sec. | 140 | 133 | 122 | 158 | 138 | 123 | 145 |

All of the foams prepared using the formulations listed in Table I shrunk upon cooling. This is believed due to the large number of closed cells present in the foam, which prevents escape of the gas generated during formation of the foam. As the foam cooled the volume of the gas trapped within these closed cells decreases, resulting in the observed shrinkage. The large number of closed cells severely restricts the "breathability" of the foam. Breathability can be measured by observing the time required to pass a given volume of air through the foam. The foams prepared using the blowing catalysts listed in Table I exhibited a relatively high resistance to air flow and were not considered acceptable quality low density foams.

EXAMPLE 2 (Control)

This example demonstrates the limited range of catalyst concentration that must be observed to prepare acceptable foams using a prior art blowing catalyst and methylene chloride as the blowing agent.

The base formulation was identical to the one described in Example 1. The gel catalyst was stannous octoate in combination with dicyclohexylmethylamine, a conventional amine catalyst for flexible polyurethane foams, at the concentration levels listed in Table II.

TABLE II

| Foams Prepared Using Prior Art Catalysts | | | |
|---|---|---|---|
| Catalyst (parts) | (1) | (2) | (3) |
| Stannous Octoate | 0.70 | 0.60 | 0.80 |
| Dicyclohexylmethylamine | 0.25 | 0.25 | 0.30 |
| Cream Time, sec. | 9 | 9 | 9 |
| Rise Time, sec. | 100 | 114 | 77 |

The formulation identified as number 1 was the only one that produced an acceptable foam. The foam produced from formulation 2 collapsed prior to achieving its full height. Formulation 3 yielded a foam that shrunk as it cooled.

EXAMPLE 3

This example demonstrates the desirable properties of foams prepared using the blowing catalysts of this invention. The base formulation employed was identical to the one described in Example 1. The four blowing catalysts evaluated exhibited the following compositions:

Catalyst A
  40 parts antimony tris-2-ethylhexoate
  40 parts zinc bis-2-ethylhexoate
  13 parts potassium 2-ethylhexoate
  107 parts polypropylene glycol
Catalyst B
  40 parts zinc bis-2-ethylhexoate
  16 parts antimony tris-2-ethylhexoate
  16 parts potassium 2-ethylhexoate
  128 parts polypropylene glycol
Catalyst C
  20 parts zinc bis-2-ethylhexoate
  60 parts antimony tris-2-ethylhexoate
  13 parts potassium 2-ethylhexoate
  107 parts polypropylene glycol
Catalyst D
  40 parts zinc bis-2-ethylhexoate
  30 parts antimony tris-2-ethylhexoate
  20 parts potassium 2-ethylhexoate
  110 parts polypropylene glycol

TABLE III

Catalytic Activity of Mixtures Containing Antimony, Potassium and Zinc Salts

| Catalyst (parts) | (1) | (2) | (3) | (4) | (5) | (6) |
|---|---|---|---|---|---|---|
| Stannous Octoate | 0.60 | 0.70 | 0.60 | 0.60 | 0.70 | 0.50 |
| Catalyst A | — | — | — | 0.15 | — | — |
| Catalyst B | 0.20 | — | — | — | — | — |
| Catalyst C | — | 0.20 | 0.20 | — | — | — |
| Catalyst D | — | — | — | — | 0.2 | 0.2 |
| Cream Time, sec. | 12 | 9 | 11 | 13 | 9 | 10 |
| Rise Time, sec. | 83 | 110 | 92 | 97 | 89 | 100 |
| Foam Properties | | | | | | |
| Density, lb/ft$^3$ | 1.03 | 1.07 | 1.06 | 1.07 | 1.14 | 1.17 |
| ILD, lb/50 in.$^2$ | | | | | | |
| 25% compression | 6.8 | 7.9 | 7.9 | 8.1 | 7.6 | 7.9 |
| 65% compression | 11.8 | 18.3 | 13.2 | 14.2 | 13.1 | 13.2 |

The indent load deflection (ILD) values of the foams listed in Table III represent the pressure required to compress the foam to 75% and 35% of its original height. The ILD values were measured in accordance with a procedure published by the American Society for Testing of Materials (ASTM test procedure 1564-71).

All of the foams prepared using the present blowing catalyst composition exhibited the desired low density of less than 1.2 pounds per square foot and acceptable load-bearing properties, as measured using the indentation load deflection test. The ratios ILD$_{65\%}$/ILD$_{25\%}$ were all within the range considered desirable for optimum seating comfort for furniture cushioning material.

What is claimed is:

1. A method for preparing low density cellular polyurethanes, said method comprising reacting a polyol having at least two reactive hydrogen atoms, as determined by the Zerewitinoff method, with an organic polyfunctional isocyanate in the presence of
   (a) from 0.5 to 40%, based on the weight of said polyol, of a blowing agent consisting essentially of water and from 10 to 90%, based on the total weight of said blowing agent, of methylene chloride,
   (b) a catalytically effective amount of a gel catalyst selected from the group consisting of stannous salts of monocarboxylic acids, wherein the acids contain from 1 to 20 carbon atoms, and organotin compounds of the general formula R$_a$SnX$_{4-a}$, wherein R is selected from alkyl and alkenyl radicals, each of which contain from 1 to 18 carbon atoms, cycloalkyl, aryl, alkaryl and aralkyl hydrocarbon radicals, and the foregoing radicals when inertly substituted, and X represents a monovalent radical selected from the group consisting of halogen atoms and radicals of the general formula R'COO—, R'S—, R'O— and —SR''COOR' wherein R' is in turn selected from the same group as R and R'' is an alkylene radical containing from 1 to 8 carbon atoms, and
   (c) a catalytically effective amount of a blowing catalyst composition consisting essentially of an antimony carboxylate, a potassium carboxylate and a zinc carboxylate, wherein the hydrocarbyl portions of said carboxylates contain from 1 to 20 carbon atoms and wherein each of said antimony and potassium carboxylates constitutes from 10 to 40% by weight of said catalyst composition and the zinc carboxylic constitutes the remaining 20 to 80% by weight.

2. A method according to claim 1 wherein said antimony, potassium, and zinc carboxylates exhibit the general formulae Sb(OOCR$^1$)$_3$, KOOCR$^2$, and Zn(OOCR$^3$)$_2$, respectively, and wherein R$^1$, R$^2$ and R$^3$ are individually selected from the group consisting of hydrocarbyl containing from 1 to 20 carbon atoms.

3. A method according to claim 2 wherein R$^1$, R$^2$ and R$^3$ are alkyl.

4. A method according to claim 2 wherein R$^1$, R$^2$ and R$^3$ are

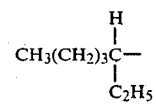

5. A method according to claim 7 wherein said composition contains a solvent for said antimony, potassium, and zinc carboxylates, said solvent being miscible with said polyol.

6. A method according to claim 5 wherein said solvent is a liquid polypropylene glycol.

* * * * *